United States Patent Office 2,730,244
Patented Jan. 10, 1956

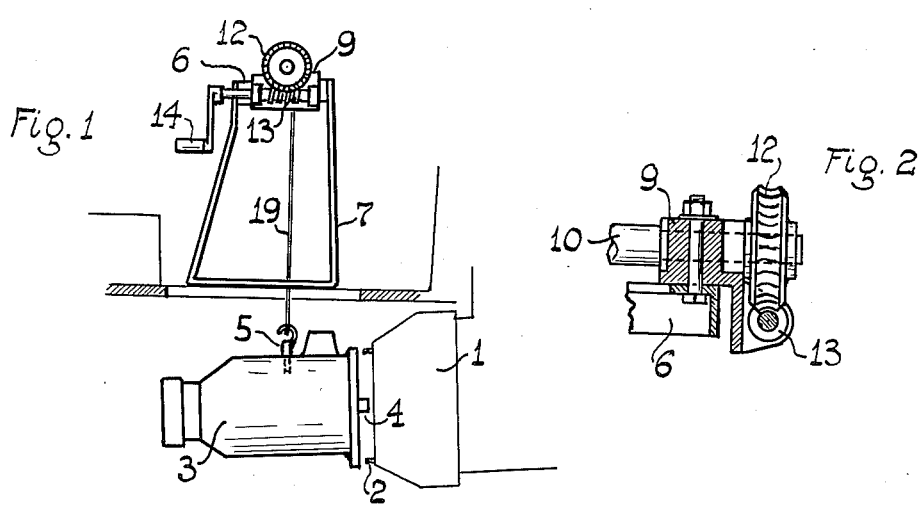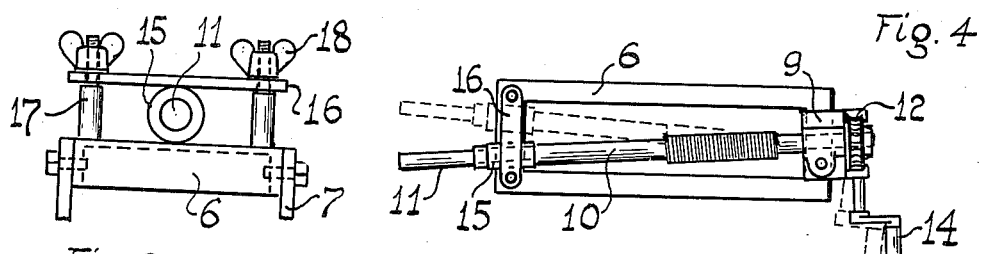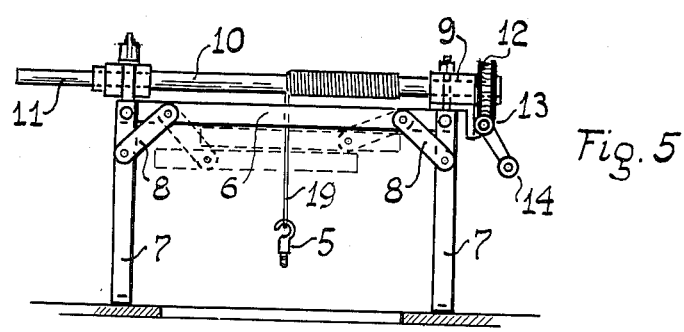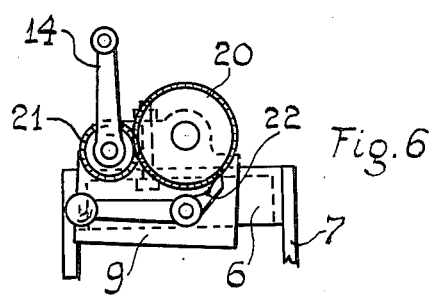

2,730,244
AUTOMOBILE TRANSMISSION HOIST

Eric E. Berggren, Milford, Conn.

Application March 10, 1955, Serial No. 493,434

4 Claims. (Cl. 212—28)

My invention relates to improvements in automobile transmission hoists.

With the increased complexity of the modern automobile transmissions, and with the resultant greater weight, their installation and handling have become increasingly difficult and exacting. For the proper installation of a transmission the following steps are usually necessary: First, to move the transmission substantially vertically until its stub shaft and bolt holes are in alignment with the corresponding bearing and bolts of the flywheel housing. The second step is to move the transmission substantially parallel to the axis of the motor drive shaft until the connecting flanges meet. As any irregularity in these motions may cause serious damage in the oil seal or in other parts of the transmission, their proper execution is of great importance. From this standpoint it is also essential that the transmission should be suspended vertically above its center of gravity in order to insure the stability of the support.

The object of my invention is to provide an automobile transmission hoist which can impart to the transmission two finely and independently controlled motions: one being substantially vertical, the other substantially parallel to the motor drive shaft, thereby greatly facilitating the proper installation of the transmission.

Another object of my invention is to provide an automobile transmission hoist which accomplishes a stable suspension of the transmission by locating the point of the suspension strictly vertically above the center of gravity of the transmission.

A further object of my invention is to provide an automobile transmission hoist which is simple, inexpensive and, due to its foldable frame, is easily transported and stored.

Other objects and advantages of my invention will be apparent during the course of the following description.

In the accompanying drawing, forming a part of this application, wherein, for the purpose of illustration, are shown a preferred and a modified form of my invention, Figure 1 is an end elevation of the preferred form of my automobile transmission hoist, Figure 2 is a sectional view of the pivoted head bearing, Figure 3 is an end view of the tail bearing and clamp, Figure 4 is a plan view of the preferred form of my hoist, Figure 5 is a side elevation of the same, Figure 6 is a modified form of the driving mechanism.

In the drawing, wherein like numerals are employed to designate like parts, the numeral 1 designates the flywheel housing, sometimes also called the clutch housing, carrying the bolts 2, used for attaching the transmission 3, having a stub shaft 4 and a flange adjacent to the flywheel housing with bolt holes corresponding to the bolts 2.

Mounted on the transmission 3 is the eyebolt 5, engaging a threaded hole in the transmission, which is located vertically above its center of gravity. This threaded hole is always provided in the transmissions for the purpose of attaching it to the conveyor in the factory assembly line.

Referring to Figs. 1 and 2, the numeral 6 designates a rectangular frame, located above the transmission in a plane parallel to the axis of the motor drive shaft, which is not horizontal but sloping toward the rear of the automobile. This frame 6 is supported by legs 7 and braces 8, which can be folded into the position shown by the dotted lines in Fig. 5, for easier transportation and storing.

As illustrated in Fig. 4, this frame 6 carries at one end the head bearing 9 secured to the frame by a perpendicular pivot. Rotatably mounted in this head bearing is the hoist shaft 10 which, at the other end of the frame, is supported by a sleeve bearing 15. This sleeve bearing is adapted to roll on the frame 6, permitting the hoist shaft 10 to swing into the position indicated by the dotted lines in Fig. 4. The hoist shaft 10 has an extension 11 which serves as handle for the manual swinging of the shaft 10. Clamping bar 16, supported by the studs 17 and thumb nuts 18, serves to secure the rollable sleeve bearing 15 in position. (See Fig. 3.)

Mounted on the pivoted head bearing 9 is the manual driving means which, in the preferred form, consists of the worm gear 12, worm 13, actuated manually by the crank 14, this worm gear being secured to the end of the shaft 10. The angle of the worm 13 will be preferably such as to make the worm drive self locking, so that a torsional force on the worm gear will not rotate the worm.

Wound on the hoist shaft 10 is the cable or wire rope 19, the free end of which is attached to the eyebolt 5. It is within the spirit of my invention to employ rope or chain instead of the cable 19.

Fig. 6 shows a modified form of the manual drive, consisting of a gear 20, secured to the shaft 10, and pinion 21, rotated by the crank 14. Ratchet 22 serves to lock the gear 20 in position.

It is also within the spirit of my invention to secure the crank 14 directly to the shaft 10, dispensing with the pinion 21, and substitute a ratchet wheel for the gear 20.

The operation of my automobile transmission hoist will be as follows:

For the removal of the transmission the floor board above the transmission is taken out, the nuts on the bolts 2 are loosened, the hoist is placed in the front compartment of the automobile, the eyebolt 5 is screwed into the threaded hole of the transmission, and attached to the cable 19. Then, with the hoist shaft 10 secured in the forward position, shown by the dotted lines in Fig. 4, the crank 14 is turned until the cable 19 becomes tight, taking over the weight of the transmission. Following this, all nuts are removed from the bolts 2 and, by means of shaft extension 11, the hoist shaft is pulled back into the position shown by the full lines in Fig. 4, causing the suspended transmission to slide backward, in the direction parallel to the axis of the motor driveshaft, into disengagement, with the result that, by means of the crank 14 the transmission can be lowered to the ground and removed.

When installing the transmission, this process will be reversed. The transmission is placed under the car, then, with the shaft 10 in the back position, shown by the full lines in Fig. 4, the transmission is hoisted up until the bolt holes are in alignment with the bolts 2. After this, the shaft 10 is swung forward into the position indicated by the dotted lines in Fig. 4, causing the transmission to slide into its normal position. The operation is completed by the tightening of the nuts on the bolts 2.

Due to the very closely fitting splined connection of the stub shaft 4, the forward sliding of the transmission into its normal operating position is the most exacting part of the installation of the transmission, the successful execution of which can be assured only by sliding the transmission strictly in the direction of the axis of the motor drive shaft. In my invention this condition is attained by two important features. The first feature is the sloping of the frame 6 toward the rear at the same angle as the motor drive shaft. The second feature is the accurate suspension of the transmission vertically above its center of gravity.

My method of suspension, utilizing a threaded hole provided by the manufacturer in the transmission housing, represents a definite improvement over the suspension method commonly used in the transmission hoists of the prior art, which consists of a cable or chain slung around the transmission housing without the exact knowledge where the center of gravity is located.

It is to be understood that the forms of my invention, herewith shown and described, are only examples of the same, and that various changes if the shape, size, and arrangement of parts may be resorted to, without departing from the spirit of my invention, or the scope of the subjoined claims.

I claim:

1. An automobile transmission hoist comprising; a frame disposed parallel to the motor drive shaft of said automobile; a head bearing pivotally mounted at one end of said frame; a hoist shaft rotatably mounted in said head bearing, and extending beyond the other end of said frame; a sleeve bearing rotatably mounted on said hoist shaft, being disposed and adapted to roll on said frame at its other end; a screw clamping means mounted on said frame and adapted to secure said sleeve bearing in position by preventing its rolling; manual driving means mounted on said pivoted head bearing and adapted to rotate said hoist shaft; a flexible cable having one end secured to, and wound on, said hoist shaft; an eyebolt secured to the free end of said cable, and having threaded portion for connection with the threaded hole of the transmission of said automobile.

2. An automobile transmission hoist comprising; a frame; a head bearing, attached to one end of said frame by a pivot; a sleeve bearing rollably mounted on the other end of said frame; a hoist shaft rotatably carried by said head bearing and by said sleeve bearing, and being disposed to swing about said pivot in a plane substantially parallel to the drive shaft of the motor of said automobile; manual driving means mounted on said head bearing and adapted to rotate said hoist shaft; a wire rope wound on said hoist shaft; an eyebolt secured to the end of said cable and adapted for threaded connection with said transmission.

3. The automobile transmission hoist of claim 2 in which the manual driving means is adapted to lock the hoist shaft in position.

4. A transmission hoist for motor vehicles comprising; a rotatable hoist shaft, supported near one end by a pivoted head bearing, and adjacent to its other end by a rollable sleeve bearing, and being disposed and adapted to swing about the pivot of said head bearing in a plane substantially parallel to the center line of the drive shaft of said motor; clamping means adapted to secure said swinging shaft in position.

No references cited.